United States Patent
Chang et al.

(10) Patent No.: US 10,338,671 B2
(45) Date of Patent: Jul. 2, 2019

(54) POWER SUPPLY CIRCUIT AND POWER SUPPLY SYSTEM

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Kung-Wei Chang, New Taipei (TW); Sheng-Liang Wang, Wuhan (CN)

(73) Assignees: HONGFUJIN PRECISION INDUSTRY (WUHAN) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 218 days.

(21) Appl. No.: 15/289,250

(22) Filed: Oct. 10, 2016

(65) Prior Publication Data
US 2018/0081422 A1    Mar. 22, 2018

(30) Foreign Application Priority Data
Sep. 18, 2016   (CN) .......................... 2016 1 0827270

(51) Int. Cl.
*G06F 1/26*   (2006.01)
*G06F 1/3296*   (2019.01)

(52) U.S. Cl.
CPC .............. *G06F 1/3296* (2013.01); *G06F 1/26* (2013.01); *Y02D 10/172* (2018.01)

(58) Field of Classification Search
CPC ..................................................... G06F 1/3296
See application file for complete search history.

(56) References Cited

U.S. PATENT DOCUMENTS

| | | | |
|---|---|---|---|
| 2012/0170321 A1* | 7/2012 | Yang | H02M 3/33523 363/16 |
| 2015/0067370 A1* | 3/2015 | Hung | H02J 9/005 713/323 |

* cited by examiner

*Primary Examiner* — Kim Huynh
*Assistant Examiner* — Joshua Neveln
(74) *Attorney, Agent, or Firm* — ScienBiziP, P.C.

(57) ABSTRACT

A power supply system for a motherboard includes a switching power source, a control circuit, and a switch circuit. The control circuit includes a photocoupler and a comparator. The photocoupler is electrically connected to the switching power source and the comparator. The switch circuit is electrically connected to the comparator and a motherboard. The switch circuit is turned off when the motherboard is in a normal state and turned on when the motherboard is in a standby state. The switching power source outputs a voltage through the control circuit when the switch circuit is turned off. When the switch circuit is turned on, the comparator outputs a first state signal to the photocoupler. The photocoupler thus outputs a first driving signal to the switching power source. The first driving signal causes the switching power source to reduce the voltage.

18 Claims, 2 Drawing Sheets

POWER SUPPLY CIRCUIT AND POWER SUPPLY SYSTEM

FIELD

The subject matter herein generally relates to power supply systems applied to a load.

BACKGROUND

A power supply system is used to output a plurality of voltages according to a state of a motherboard. A control circuit to readily switch between the motherboard standby state and a normal state would improve the responsiveness of the system and reduce excessive power usage by the power supply system. Therefore, there is room for improvement in the art.

BRIEF DESCRIPTION OF THE DRAWINGS

Implementations of the present technology will now be described, by way of example only, with reference to the attached figures.

DETAILED DESCRIPTION

Figure 1:
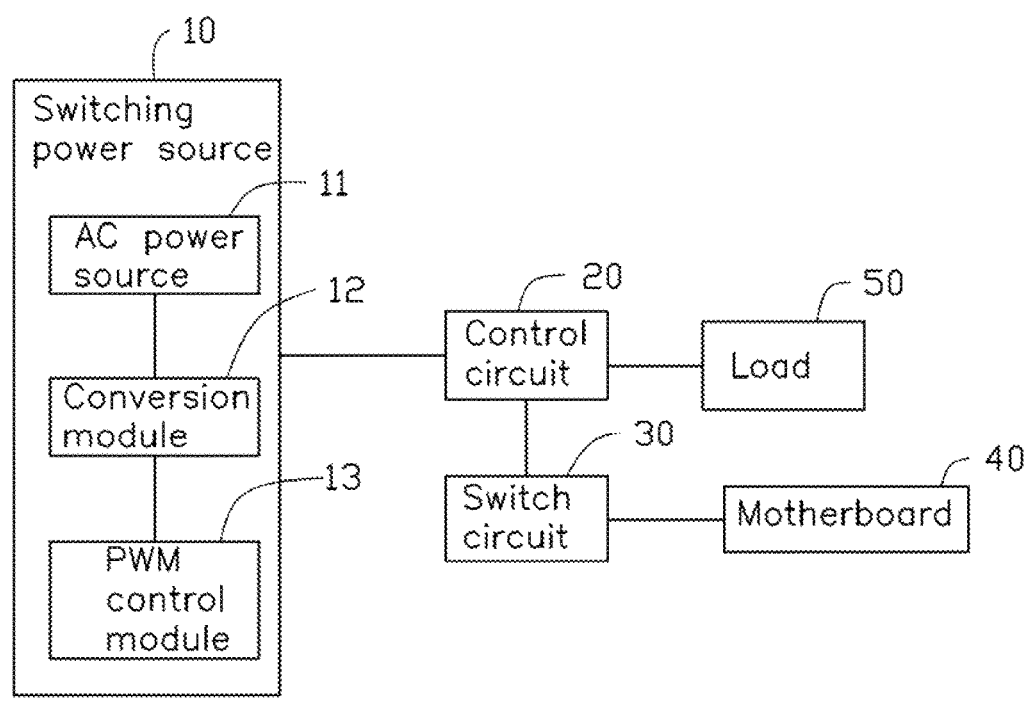
FIG. 1 is a block diagram of one exemplary embodiment of a power supply system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

The present disclosure is described in relation to a power supply system. The power supply system is used in an electronic device to provide a plurality of voltages to a load according to a state of a motherboard.

FIG. 1 illustrates an exemplary embodiment of a power supply system. The power supply system is used in an electronic device. The power supply system comprises a power supply circuit and a motherboard 40. The power supply circuit comprises a switching power source 10, a control circuit 20, and a switch circuit 30. The switching power source 10 is electrically connected to the control circuit 20. The control circuit 20 is electrically connected to the switch circuit 30. The switch circuit 30 is electrically connected to the motherboard 40 to receive a switching signal PS_ON (power supply on) sent from the motherboard 40. The control circuit 20 is configured to electrically connect to a load 50.

When the motherboard 40 is in a first state, the switching signal PS_ON is set to a first state signal, and when the motherboard 40 is in a second state, the switching signal PS_ON is set to a second state signal. Specifically, in one exemplary embodiment, the first state may be in a normal state and the second state may be in a standby state. The first state signal may be a low level signal, and the second state signal may be a high level signal.

The switching signal PS_ON is configured to control the switch circuit 30 to turn it on or off. The switch circuit 30 is configured to control the control circuit 20 to output an output signal. Specifically, in one exemplary embodiment, when the switching signal PS_ON is in the first state signal (e.g. a low level signal), the switch circuit 30 is turned off. The control circuit 20 outputs a first driving signal to the switching power source 10 causing the switching power source 10 to output a constant power supply voltage V1 to the load 50. When the switching signal PS_ON is in the second state signal (e.g. a high level signal), the switch circuit 30 is turned on causing the control circuit 20 to output a second driving signal to the switching power source 10. The second driving signal controls the switching power source 10 to reduce the power supply voltage V1. The switching power source 10 then outputs a variable output voltage V2 to the load 50. When the motherboard 40 is converted to the standby state from the normal state, the power supply voltage V1 is reduced to be equal to the output voltage V2. The switching power source 10 is then used to reduce the output voltage V2. The output voltage V2 is less than the power supply voltage V1. The switching power source 10 is used to continuously reduce the output voltage V2 until the output voltage V2 is at a suitable value. In one exemplary embodiment, the suitable value is less than the power supply voltage V1 and not less than half of the power supply voltage V1.

The switching power source 10 is configured to respond to a pulse width modulation (PWM) technique. The switching power source 10 comprises an alternating current (AC) power source 11, a conversion module 12, and a PWM control module 13. The AC power source 11 is electrically connected to the conversion module 12. The conversion module 12 is electrically connected to the PWM control module 13. The AC power source 11 is configured to output an AC voltage. The PWM control module 13 controls the conversion module 12 to convert the AC voltage to a direct current (DC) voltage. The control circuit 20 is configured to receive the instant voltage from the conversion module 12. The control circuit 20 is further configured to output the power supply voltage V1 or the output voltage V2 according to the DC voltage from the conversion module 12.

Figure 2:
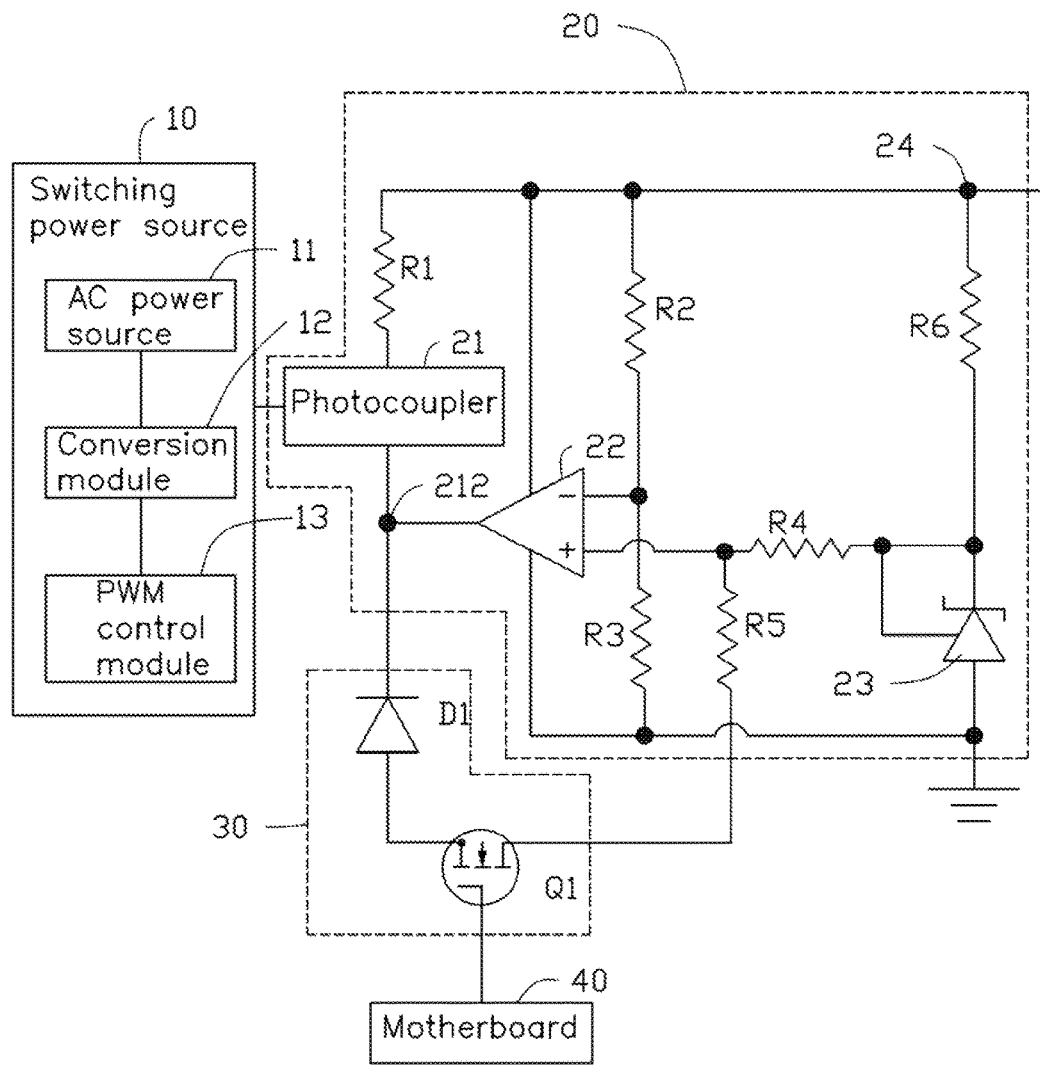
FIG. 2 is a circuit diagram of one exemplary embodiment of the power supply system of FIG. 1.

FIG. 2 illustrates the control circuit 20 comprising a photocoupler 21, a comparator 22, and a regulator 23. The control circuit 20 further comprises an output node 24. The photocoupler 21 is self-contained, having its own light-emitting source and optical light receiver. The regulator 23 is configured to provide a reference voltage Vr. The output node 24 is configured to output the power supply voltage V1 or the output voltage V2 to the load 50.

The switch circuit 30 comprises a transistor Q1 and a diode D1. The transistor Q1 comprises a control terminal, a first connection terminal, and a second connection terminal.

In one exemplary embodiment, the transistor Q1 is a metal oxide semiconductor (MOS) transistor.

A first resistor R1 is electrically coupled between the photocoupler 21 and the output node 24. A second resistor R2 is electrically coupled between the negative input terminal of the comparator 22 and the output node 24. A third resistor R3 is electrically coupled between the negative input terminal of the comparator 22 and a ground terminal. A fourth resistor R4 is electrically coupled between the regulator 23 and a positive input terminal of the comparator 22. The control terminal of the transistor Q1 is electrically connected to the motherboard 40 to receive the switching signal PS_ON from the motherboard 40. The diode D1 is electrically coupled between a connection node 212 and the first connection terminal of the transistor Q1. A fifth resistor R5 is electrically coupled between the second connection terminal of the transistor Q1 and the positive input terminal of the comparator 22. A sixth resistor R6 is electrically coupled between the regulator 23 and the output node 24. An output terminal of the comparator 22 is electrically connected to the connection node 212. The photocoupler 21 is electrically coupled between the first resistor R1 and the output node 24. The photocoupler 21 is electrically connected to the switching power source 10.

The power supply voltage V1 is divided into a first voltage V3 by the second resistor R2 and the third resistor R3. The first voltage V3 is provided to the negative input terminal of the comparator 22. The output voltage V2 is divided into a second voltage V4 by the second resistor R2 and the third resistor R3. The second voltage V4 is provided to the negative input terminal of the comparator 22. The reference voltage Vr from the regulator 23 is divided into a third voltage V5 by the resistor R4 and the resistor R5. The third voltage V5 is provided to the positive input terminal of the comparator 22. In one exemplary embodiment, a value of the reference voltage Vr is equal to that of the first voltage V3.

The working principle of the power supply system will now be described.

When the motherboard 40 is in the normal state, the motherboard 40 sends the first state signal (a low level signal) to the transistor Q1. The low level signal turns off the transistor Q1, and the diode D1 disconnects the comparator 22. The positive input terminal of the comparator 22 receives the reference voltage Vr from the regulator 23. The negative input terminal of the comparator 22 receives the first voltage V3. When the reference voltage Vr is equal to the first voltage V3, the output terminal of the comparator 22 outputs a first control signal to the photocoupler 21. After receiving the first control signal, the photocoupler 21 then outputs the first driving signal to the PWM control module 13. After receiving the first driving signal, the PWM control module 13 controls the switching power source 10 to output the constant power supply voltage V1. The power supply voltage V1 is then provided to the load 50 through the output node 24.

When the motherboard 40 is in the standby state, the motherboard 40 sends the second state signal (the high level signal) to the transistor Q1. The transistor Q1 and the diode D1 are turned on. The reference voltage Vr from the regulator 23 is divided into a third voltage V5 by the resistor R4 and the resistor R5. The third voltage V5 is provided to the positive input terminal of the comparator 22. The positive input terminal of the comparator 22 receives the third voltage V5. Since the second voltage V4 is greater than the third voltage V5, the output terminal of the comparator 22 outputs a second control signal to the photocoupler 21. After receiving the second control signal, the photocoupler 21 outputs a second driving signal to the PWM control module 13. After receiving the second driving signal, the PWM control module 13 reduces the power supply voltage V1. The output terminal of the comparator 22 continuously outputs the second control signal to the photocoupler 21. The photocoupler 21 then outputs the second driving signal to the PWM control module 13. The PWM control module 13 reduces the output voltage V2 according to the second driving signal. The PWM control module 13 maintains the reduction of the output voltage V2 until the second voltage V4 divided from the output voltage V2 is equal to the third voltage V5. A value of the positive input terminal of the comparator 22 is equal to a value of the negative input terminal of the comparator 22. The output terminal of the comparator 22 outputs the first control signal to the photocoupler 21. After receiving the first control signal, the photocoupler 21 outputs the first driving signal to the PWM control module 13. After receiving the first driving signal, the PWM control module 13 controls the switching power source 10 to output a constant fourth voltage V6. Thus, when the motherboard 40 is in the standby state, the control circuit 20 can control the switching power source 10 to change the power supply voltage from V1 to V2. Then the switching power source 10 outputs the power supply voltage to V6 from V2. The output node 24 provides the fourth voltage V6 to the load 50. In the exemplary embodiment, the motherboard 40 defines a minimum voltage. A switching voltage is greater than or equal to the minimum voltage. The switching voltage is provided to the motherboard 40 to turn on the motherboard 40. The fourth voltage V6 is greater than the minimum voltage. In one exemplary embodiment, the minimum voltage is half of the power supply voltage V1.

In a first exemplary embodiment, a value of the power supply voltage V1 is 5V. The power supply voltage V1 is divided into a first voltage V3 by the second resistor R2 and the third resistor R3. The first voltage V3 is at 2.5V. The first voltage V3 is provided to the negative input terminal of the comparator 22. The regulator 23 is configured to output a reference voltage Vr. The reference voltage Vr is at 2.5V. When the motherboard 40 is in the normal state, the motherboard 40 sends the first state signal to the transistor Q1. The transistor Q1 is thus turned off and the comparator 22 is disconnected because of the diode D1. The positive input terminal of the comparator 22 receives the reference voltage Vr from the regulator 23. The positive input terminal of the comparator 22 is at 2.5V. The negative input terminal of the comparator 22 is at 2.5V. The output terminal of the comparator 22 outputs the first control signal to the photocoupler 21. After receiving the first control signal, the photocoupler 21 outputs the first driving signal to the PWM control module 13. After receiving the first driving signal, the PWM control module 13 controls the switching power source 10 to output the power supply voltage V1. The power supply voltage V1 is constant. The power supply voltage V1 is at 5V.

In the first exemplary embodiment, when the motherboard 40 is in the standby state, the motherboard 40 send the second state signal to the transistor Q1. The transistor Q1 is turned on and the diode D1 is thus turned on. The reference voltage Vr from the regulator 23 is divided into a third voltage V5 by the resistor R4 and the resistor R5. The third voltage V5 is at 1.25V. The third voltage V5 is provided to the positive input terminal of the comparator 22. The positive input terminal of the comparator 22 receives the second voltage V4. The first voltage V3 is greater than the second voltage V4, and the output terminal of the comparator 22 outputs the third signal to the photocoupler 21. After receiving the third signal, the photocoupler 21 outputs the second driving signal to the PWM control module 13. The PWM control module 13 reduces the power supply voltage V1. The output terminal of the comparator 22 outputs the second control signal to the photocoupler 21. The photocoupler 21 continuously outputs the second driving signal to the PWM control module 13 according to the second control signal. The PWM control module 13 then reduces the output voltage V1 according to the second driving signal. The switching power source 10 thus outputs the output voltage V2 until a value of the output voltage V2 is at 2.5V. The output voltage V2 is divided into a second voltage V4. The second voltage V4 is at 1.25V. The second voltage V4 is provided to the negative input terminal of the comparator 22. The positive input terminal of the comparator 22 is at 1.25V. The negative input terminal of the comparator 22 is at 1.25V. The output terminal of the comparator 22 outputs the first control signal to the photocoupler 21. After receiving the first control signal, the photocoupler 21 outputs the first driving signal to the PWM control module 13. After receiving the first driving signal, the PWM control module 13 controls the switching power source 10 to output the constant fourth voltage V6. A value of the fourth voltage V6 is at 2.5V.

In the first exemplary embodiment, when the motherboard 40 is converted to the standby state from the normal state, the control circuit 20 can control the switching power source 10 to output power supply voltage V1 to 2.5V from 5V.

In a second exemplary embodiment, the switching power source 10 is configured to provide a 12V DC voltage. According to the working principle of the power supply system, when the motherboard 40 is converted to the standby state from the normal state, the control circuit 20 controls the switching power source 10 to output the power supply voltage V1 to 6V from 12V.

In another exemplary embodiment, different resistors or different regulators can be used to control the switching power source 10 to output different power supply voltages V1. The value of the power supply voltage V1 can thus be reduced to a suitable value.

It is to be understood that even though numerous characteristics and advantages have been set forth in the foregoing description of embodiments, together with details of the structures and functions of the embodiments, the disclosure is illustrative only and changes may be made in detail, including in the matters of shape, size, and arrangement of parts within the principles of the disclosure to the full extent indicated by the broad general meaning of the terms in which the appended claims are expressed.

What is claimed is:

1. A power supply system comprising:
   a motherboard;
   a switching power source;
   a switch circuit electrically connected to the motherboard; and
   a control circuit having:
      a photocoupler electrically connected to the switching power source, and
      a comparator electrically connected to the switch circuit and the photocoupler; and
   wherein the switch circuit is configured to:
      be turned off when the motherboard is in a normal state, and
      be turned on when the motherboard is in a standby state;
   wherein the switching power source is configured to output a power supply voltage through the control circuit when the switch circuit is turned off;
   wherein the comparator outputs a first control signal to the photocoupler when the switch circuit is turned on;
   wherein the photocoupler is configured to output a first driving signal to the switching power source after receiving the first control signal;
   wherein the switching power source is configured to reduce the power supply voltage after receiving the first driving signal;
   wherein the control circuit further comprises a regulator, the regulator is electrically connected to the comparator, and the regulator is configured to provide a reference voltage to the comparator when the switch circuit is turned off; and
   wherein the power supply voltage is divided into a first voltage, the first voltage is provided to a negative input terminal of the comparator, and the reference voltage is provided to a positive input terminal of the comparator.

2. The power supply system of claim 1, wherein when the motherboard is in the normal state the first voltage is equal to the reference voltage.

3. The power supply system of claim 2, wherein when the motherboard is in the standby state, the power supply voltage is reduced to be an output voltage, the output voltage is divided into a second voltage, the second voltage is provided to the negative input terminal of the comparator, the reference voltage is divided into a third voltage, the third voltage is provided to the positive input terminal of the comparator, and wherein when the second voltage is greater than the third voltage the comparator outputs the second control signal to the photocoupler.

4. The power supply system of claim 3, wherein when the second voltage is equal to the third voltage the comparator is configured to output a first control signal to the photocoupler, and after receiving the first control signal the photocoupler outputs a first driving signal to the switching power source, and the switching power source outputs a fourth voltage after receiving the first driving signal.

5. The power supply system of claim 1, wherein when the motherboard is in the normal state the motherboard is configured to send a first state signal to the switch circuit, and after receiving the first state signal the switch circuit is turned off, and wherein when the motherboard is in the standby state the motherboard is configured to send a second state signal to the switch circuit, and the switch circuit is turned on after receiving the second state signal.

6. The power supply system of claim 1, wherein the control circuit comprises an output node, a first resistor is electrically coupled between the output node and the photocoupler, wherein the output node outputs the power supply voltage.

7. The power supply system of claim 6, wherein a second resistor is electrically coupled between the output node and the negative input terminal of the comparator, a third resistor is electrically coupled between a ground terminal and the negative input terminal of the comparator, and a fourth resistor is electrically coupled between the output node and the positive input terminal of the comparator.

8. The power supply system of claim 1, wherein the switch circuit comprises a transistor, a control terminal of the transistor is electrically coupled to the motherboard, a first connection terminal of the transistor is electrically coupled to the positive input terminal of the comparator through a fifth resistor, a second connection terminal of the transistor is electrically coupled to an output terminal of the comparator, wherein when the motherboard is in the normal state the transistor is turned off, and wherein when the motherboard is in the standby state the transistor is turned on, and wherein the reference voltage from the regulator is divided into a third voltage, and the third voltage is provided to the positive input terminal of the comparator.

9. The power supply system of claim 8, wherein the switch circuit further comprises a diode, the diode is electrically coupled between the second connection terminal of the transistor and the output terminal of the comparator, and the diode is turned on when the transistor is turned on.

10. A power supply system comprising:
a motherboard configured to:
output a first state signal when being in a first state, and
output a second state signal when being in a second state;
a switching power source;
a switch circuit electrically connected to the motherboard; and
a control circuit having:
a photocoupler electrically connected to the switching power source, and
a comparator electrically connected to the switch circuit and the photocoupler; and
wherein the switch circuit is configured to:
be turned off when receiving the first state signal, and
be turned on when receiving the second state signal;
wherein the switching power source is configured to output a power supply voltage through the control circuit when the switch circuit is turned off;
wherein the comparator outputs a first control signal to the photocoupler when the switch circuit is turned on;
wherein the photocoupler is configured to output a first driving signal to the switching power source after receiving the first control signal;
wherein the switching power source is configured to output an output voltage after receiving the first driving signal;
wherein the control circuit further comprises a regulator, the regulator is electrically connected to the comparator, and the regulator is configured to provide a reference voltage to the comparator when the switch circuit is turned off; and
wherein the power supply voltage is divided into a first voltage, the first voltage is provided to a negative input terminal of the comparator, and the reference voltage is provided to a positive input terminal of the comparator.

11. The power supply system of claim 10, wherein the first state is a normal state, the second state is a standby state, the first state signal is a low level signal, and the second state signal is a high level signal.

12. A power supply circuit comprising:
a switching power source;
a switch circuit configured to electrically connect to a motherboard; and
a control circuit having:
a photocoupler electrically connected to the switching power source, and
a comparator electrically connected to the switch circuit and the photocoupler; and
wherein the switch circuit is configured to:
be turned off when the motherboard is in a normal state, and
be turned on when the motherboard is in a standby state;

wherein the switching power source is configured to output a power supply voltage through the control circuit when the switch circuit is turned off;
wherein the comparator outputs a first control signal to the photocoupler when the switch circuit is turned on;
wherein the photocoupler is configured to output a first driving signal to the switching power source after receiving the first control signal;
wherein the switching power source is configured to reduce the power supply voltage after receiving the first driving signal;
wherein the control circuit further comprises a regulator, the regulator is electrically connected to the comparator, and the regulator is configured to provide a reference voltage to the comparator when the switch circuit is turned off; and
wherein the power supply voltage is divided into a first voltage, the first voltage is provided to a negative input terminal of the comparator, and the reference voltage is provided to a positive input terminal of the comparator.

13. The power supply circuit of claim 12, wherein when the motherboard is in the normal state the first voltage is equal to the reference voltage.

14. The power supply circuit of claim 13, wherein when the motherboard is in the standby state, the power supply voltage is reduced to be an output voltage, the output voltage is divided into a second voltage, the second voltage is provided to the negative input terminal of the comparator, the reference voltage is divided into a third voltage, the third voltage is provided to the positive input terminal of the comparator, and wherein when the second voltage is greater than the third voltage the comparator outputs the second control signal to the photocoupler.

15. The power supply circuit of claim 14, wherein the comparator is configured to output a first control signal to the photocoupler when the second voltage is equal to the third voltage, the photocoupler output the first driving signal to the switching power source after receiving the first control signal, and the switching power source outputs a fourth voltage after receiving the first driving signal.

16. The power supply circuit of claim 12, wherein the control circuit comprises an output node, a first resistor is electrically coupled between the output node and the photocoupler, and the output node outputs the power supply voltage.

17. The power supply circuit of claim 12, wherein the switch circuit comprises a transistor, a control terminal of the transistor is electrically coupled to the motherboard, a first connection terminal of the transistor is electrically coupled to the positive input terminal of the comparator through a fifth resistor, a second connection terminal of the transistor is electrically coupled to an output terminal of the comparator, wherein when the motherboard is in the normal state the transistor is turned off, wherein when the motherboard is in the standby state the transistor is turned on, and wherein the reference voltage from the regulator is divided into a third voltage, and the third voltage is provided to the positive input terminal of the comparator.

18. The power supply circuit of claim 17, wherein the switch circuit further comprises a diode, the diode is electrically coupled between the second connection terminal of the transistor and the output terminal of the comparator, and the diode is turned on when the transistor is turned on.

* * * * *